US006981170B2

(12) United States Patent
Nakagawa et al.

(10) Patent No.: US 6,981,170 B2
(45) Date of Patent: Dec. 27, 2005

(54) CONTROL METHOD OF STORAGE CONTROL APPARATUS AND STORAGE CONTROL APPARATUS

(75) Inventors: Yoshihito Nakagawa, Oi (JP); Hiroshi Ogasawara, Odawara (JP); Katsuhiro Uchiumi, Odawara (JP); Shinichi Nakayama, Chigasaki (JP); Yutaka Takata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 131 days.

(21) Appl. No.: 10/754,164

(22) Filed: Jan. 9, 2004

(65) Prior Publication Data

US 2004/0249858 A1 Dec. 9, 2004

(30) Foreign Application Priority Data

Jun. 3, 2003 (JP) .............................. 2003-158271

(51) Int. Cl.[7] ............................................ G06F 11/00
(52) U.S. Cl. ............................................. 714/4; 714/6
(58) Field of Search ............................ 714/4, 6, 55, 13; 709/223, 224

(56) References Cited

U.S. PATENT DOCUMENTS

| | | | |
|---|---|---|---|
| 6,308,284 B1 * | 10/2001 | LeCrone et al. ................ | 714/6 |
| 6,330,687 B1 * | 12/2001 | Griffith ........................... | 714/6 |
| 6,684,306 B1 * | 1/2004 | Nagasawa et al. .......... | 711/162 |
| 2003/0046602 A1 | 3/2003 | Hino et al. | |
| 2003/0131192 A1 * | 7/2003 | Nakamura et al. .......... | 711/114 |
| 2003/0158933 A1 * | 8/2003 | Smith ........................ | 709/224 |
| 2003/0233502 A1 * | 12/2003 | Murotani et al. ............. | 710/74 |
| 2004/0039756 A1 * | 2/2004 | Bromley ..................... | 707/200 |
| 2004/0153719 A1 | 8/2004 | Achiwa et al. | |
| 2004/0199815 A1 | 10/2004 | Dinker et al. | |

FOREIGN PATENT DOCUMENTS

JP 2002-351703 12/2002

* cited by examiner

Primary Examiner—Scott Baderman
(74) Attorney, Agent, or Firm—Townsend and Townsend and Crew LLP

(57) ABSTRACT

A control method is disclosed for a storage control apparatus having a plurality of channel control units connected to communicate with each other and which receives a data input or data output request transmitted from an information processing device and controls writing and reading of data to a storage device in accordance with the data input/output request, and a disk control unit which carries out the writing and reading of data to the storage device in accordance with the control signal. A first channel control unit monitors the information processing device by communicating with the information processing device. When a problem is detected in the information processing device, the channel control unit restricts processing to be carried out in accordance with the data input/output request by a second channel control unit to which the data input/output transmitted from the information processing device is delivered.

11 Claims, 7 Drawing Sheets

INFORMATION PROCESSING DEVICE
—WWN CORRESPONDENCE TABLE

| IP ADDRESS OF INFORMATION PROCESSING DEVICE | WWN WHICH IS GIVEN TO COMMUNICATION PORT OF INFORMATION PROCESSING DEVICE |
|---|---|
| 192.168.0.1 | 10:00:00:00:00:00:00:01 |
| 192.168.0.2 | 10:00:00:00:00:00:00:02 |
| 192.168.0.3 | 12:00:00:00:00:00:00:01 |
| 192.168.0.4 | 12:00:00:00:00:00:00:02 |
| ⋮ | ⋮ |

CONTROL METHOD OF STORAGE CONTROL APPARATUS AND STORAGE CONTROL APPARATUS

BACKGROUND OF THE INVENTION

1. Field of the Invention

This invention relates to a control method for a storage control apparatus, and a storage control apparatus.

2. Description of the Related Art

The amount of data handled by computer systems has increased enormously over the recent past. To effectively use and manage the huge quantities of data in a data center or the like, storage systems are provided. Such systems are designed to connect a storage device such as a disk array device or the like and an information processing device by a network, usually for exclusive use, to realize high speed, and to have access to the storage apparatus and its associated massive amount of storage space. The network commonly used to realize high-speed data transfer is a Storage Area Network (SAN), which is a network configured in communication apparatuses based on the fibre channel protocol. Another type of apparatus has been developed, referred to as Network Attached Storage (NAS), which allows access with file designations from an information processing device through a Local Area Network (LAN), using a Transmission Control Protocol/Internet Protocol (TCP/IP). The network connects the storage devices and the information processing device.

As the importance of the data handled by a storage system increases, reliability and availability of the data in the system become increasingly important. In response, to improve the reliability and availability of storage systems, a technology referred to as cluster storage has been developed, for example, as shown in JP-A-2002-351703. The cluster is configured, for example, as a group of information processing devices which provides fail-over to other members of the cluster when needed. This enables improving the reliability and availability of the storage system.

Another issue in modern storage systems is that if processing of a data input/output request being transmitted from an information processing device is made without any change, regardless of a failure of the information processing device, data in the storage device may be lost, or there may be an administrative mismatch of data, or other problems will occur. To enhance the reliability and availability of the storage system, it is also important to prevent problems that occur on the information processing device from impacting the quality of the data in the storage device.

This invention provides an improved storage control apparatus, and an improved method of controlling a storage control apparatus, which improves the reliability of the storage system and the availability of the data therein.

BRIEF SUMMARY OF THE INVENTION

One feature of the invention is the provision of a control method for a storage control apparatus in which a multiplicity of channel control units are connected in a manner to enable them to communicate with each other, and which receive a data input and output requests from an information processing device. The storage system provides a control signal to control the writing and reading of data to a storage device in accordance with the data input and output request. The storage control apparatus further includes a disk control unit which carries out the writing and reading of data to the storage device in accordance with the control signal. In the disk controller a first channel control unit monitors operation of the information processing device by communicating with the information processing device. If the first channel control unit detects a problem in the information processing device, the channel control unit restricts the processing to be carried out in response to the data input and output request by a second channel control unit to which the data input and output from the information processing device is delivered.

The control signal, for example, can be a signal which is transferred from the channel control unit to the disk control unit, directly or indirectly through a shared memory or a cache memory (described below). When a problem occurs in the information processing device, that fact is detected by the first channel control unit, and in response to this, processing restricting the processing to be carried out in response to the data input and output request by the second channel control unit is executed. In this way, the second channel control unit carries out abnormal processing in response to an abnormal data input and output request transmitted from the information processing device in which the problem occurs. As a result, damage to data stored in the storage device and administrative mismatch of data can be prevented, and the reliability and availability of the storage system is improved. Other advantages of the invention are described below.

BRIEF DESCRIPTION OF THE DRAWINGS

The invention, together with further advantages thereof, may be best be understood by reference to the detailed description below taken in conjunction with the accompanying drawings in which.

DETAILED DESCRIPTION OF THE INVENTION

Figure 1:
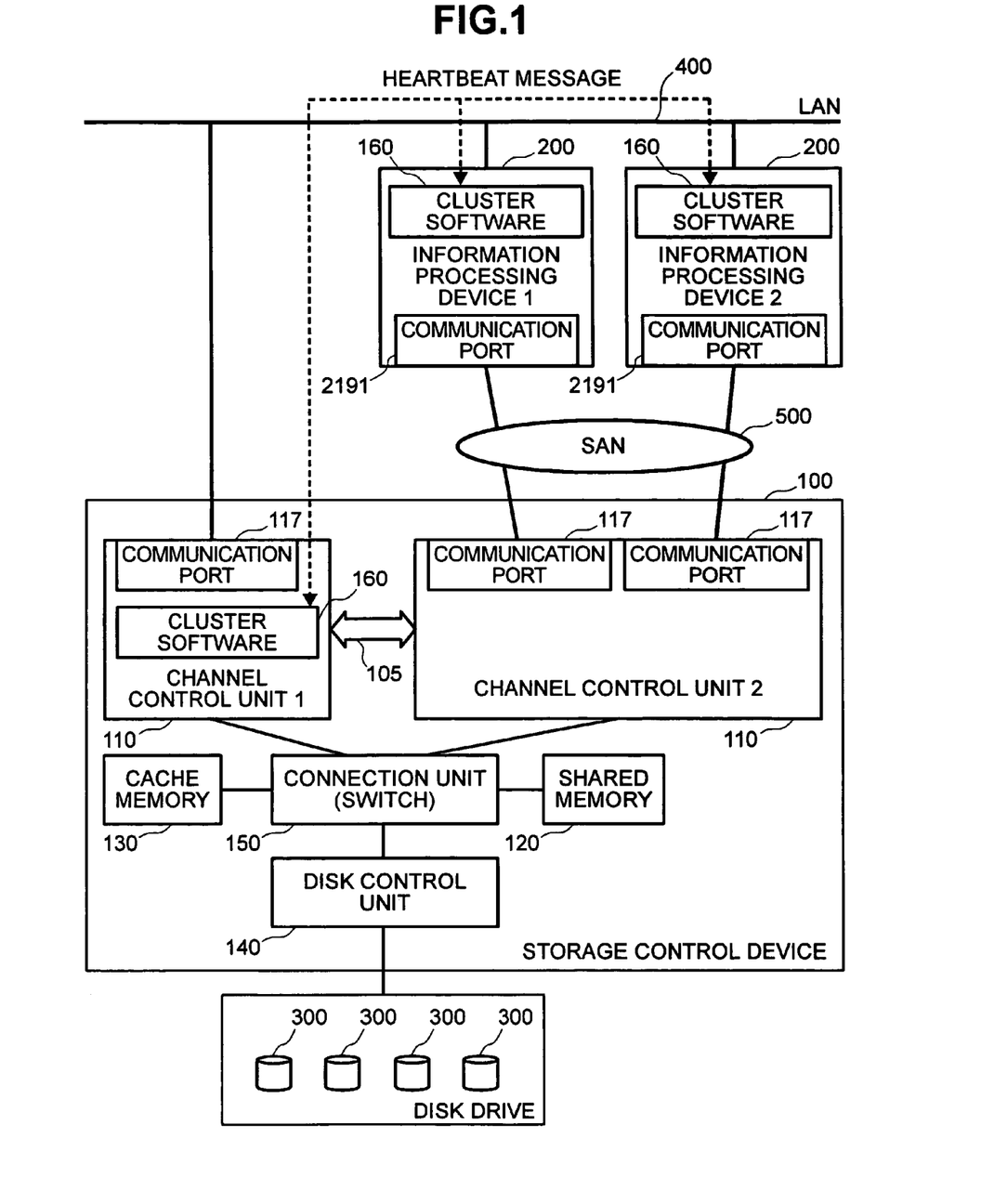
FIG. 1 is a schematic illustrating the structure of a storage system according to an embodiment of the invention.

FIG. 1 illustrates a storage system architecture according to one embodiment of the invention. This storage system is typically situated in a data center or similar facility. The storage system can be used for various applications such as Web site operations on the Internet; providing Application Service Provider (ASP) services for an on-line system, in a bank, in a brokerage firm, operation of batch processing system, or other well known uses.

The storage system is configured by including a storage control device 100, information processing devices 1 and 2

(200) which are connected to storage control device 100 in a manner such that they can communicate with each other and which enable transmission of data read/write requests (often referred to as data input/output requests) to storage control device 100, and one or more disk drives 300 (storage device) which are controlled by storage control device 100 and provide data storage areas. Storage control device 100 receives the data input and output requests being transmitted from information processing device 200, and carries out processing regarding the reading and writing of data in disk drives 300, in response to the data input/output requests.

Storage control device 100 and information processing devices 1 and 2 (200) are connected to each other through Local Area Network (LAN) 400 to enable communication with each other. Communication carried out through LAN 400 typically is in accordance with a TCP/IP protocol. Information processing devices 1 and 2(200) and storage control device 100 are connected to each other through Storage Area Network (SAN) 500 in a manner to also enable communication with each other. Communication through SAN 500 is conducted, for example, in accordance with a fiber channel, iSCSI, FICON®, ESCON®, ACONARC®, FIBARC® or other techniques.

Each of the information processing devices 1 and 2(200) typically is a computer which has a Central Processing Unit (CPU) and a memory. Information processing device 1 and 2 (200) can be, for example, a personal computer, a work station, a mainframe computer, etc. The various programs executed by the CPU realize various functions that the information processing devices 1 and 2 (200) provide are realized. In information processing device 200, includes an operating system. Various software application programs run on the operating system. A cluster software, which will be described later, is one of the application programs on the operating system.

Figure 2:
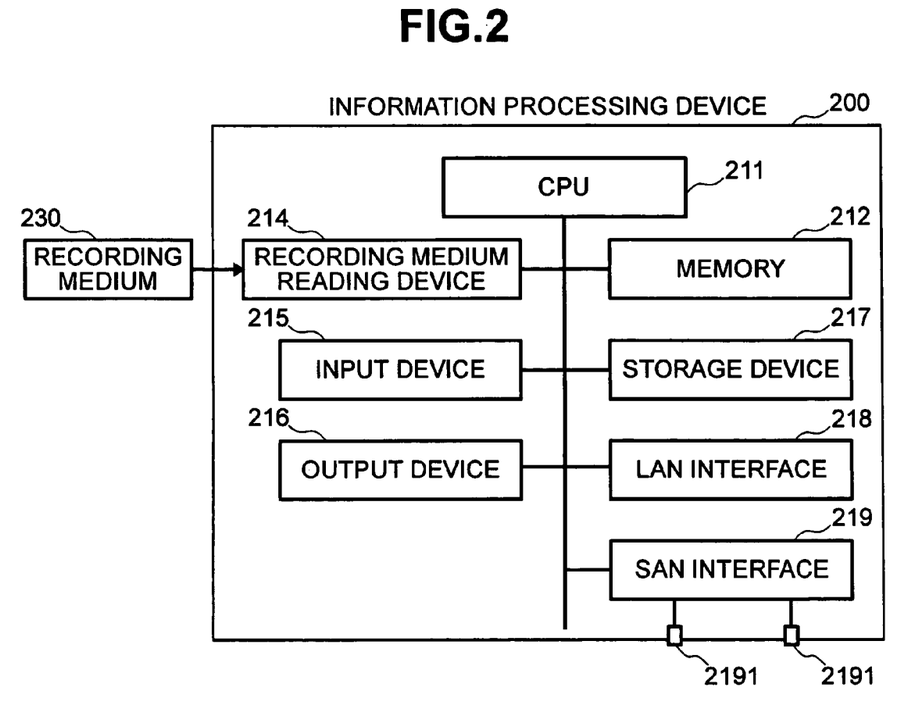
FIG. 2 is a block diagram of an information processing device according to an embodiment of the invention.

FIG. 2 shows a typical hardware structure of information processing device 200. Information processing device 200 includes a CPU 211, a memory 212, a recording medium reading device 214, an input device 215, an output device 216, a storage device 217, a LAN interface 218, and a SAN interface 219. CPU 211 executes a program which is stored in memory 212. The recording medium reading device 214 reads programs and data recorded on a recording medium 230, for example, a flexible disk, CD-ROM, DVD-ROM, DVD-R, DVD-RW, a semiconductor memory, or other memory can be used. Recording medium reading device 214 may be included with information processing device 200 or may be externally disposed.

Storage device 217 can be implemented as, for example, a hard disk device, a flexible device, a semiconductor storage device, or other memory. Input device 215 is a user interface for data input to information processing device 200 by a user or an operator. A keyboard, a mouse, or other known input device provides input device 215. Output device 216, for example, is provided as a display, a printer or other apparatus.

LAN interface 218 is a communication interface for connecting information processing device 200 to LAN 400, for example, an Ethernet® card may be used. SAN interface 219 is a communication interface for connecting information processing device 200 to SAN 500. As SAN interface 219, a network card which provides a fiber channel protocol can be used. A communication port 2191 provides a connection port for information processing device 200 to SAN 500; for example, using the [N_Port], [NL_Port] communication standard of the fiber channel. A World Wide Name (WWN), a network address for specifying a node on SAN 5002, is given to communication port 2191.

Storage control device 100 shown in FIG. 1 includes channel control units 1 and 2 (110), a shared memory 120, a cache memory 130, a disk control unit 140, and a connection unit 150. Storage control device 100 contains channel control units 1 and 2 (110), which provide a communication function with information processing devices 1 and 2 (200). Channel control unit 1 (110) provides a communication function with information processing devices 1 and 2 (200) through LAN 400. Channel control unit 2 (110) provides a communication function with information processing devices 1 and 2 (200) through SAN 500. Channel control unit 1 (110) and channel control unit 2 (110) are connected to each other through a bus line 105 in a manner such that they can communicate with each other. Channel control unit 1 (110) and channel control unit 2 (110) can transmit or receive a data signal, an interrupt signal, and on the like, to and from each other through bus line 105. Hereinafter, channel control unit 1 (110) is also referred to as CHN. Channel control unit 2 (110) is also referred to as CHF.

Figure 3:
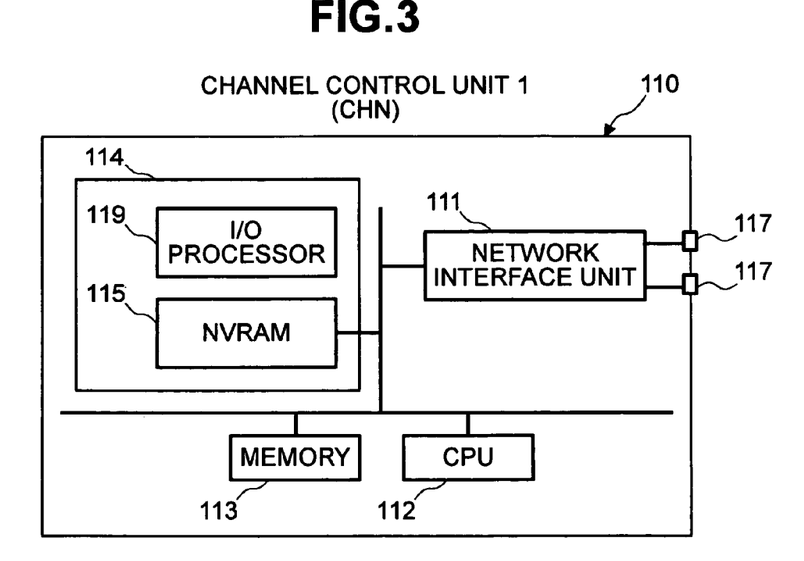
FIG. 3 is a block diagram of a channel control unit 1 (CHN) according to an embodiment of the invention.

FIG. 3 shows a hardware structure of channel control unit 1 (CHN) 110. Channel control unit 1 (CHN) 110 includes a network interface unit 111, CPU 112, a memory 113, an input/output control unit 114, and a communication port 117. Network interface unit 111 is a communication interface to be connected to LAN 400. A communication line to be connected to LAN 400 is connected to communication port 117.

In channel control unit 1 (CHN) 110, is an active operating system. Various application software runs on the operating system. Functions of the operating system and application software are realized by execution of programs that CPU 112 loads in memory 113. The programs are stored, for example, in a disk drive 300, NVRAM 115, and the like.

The operating system can be based on UNIX® or Windows® series, or other systems, and usually includes a file system. A file system protocol such as Network File System (NFS) or Common Internet File System (CIFS) runs on the operating system to accept data input and output requests with file designation (hereinafter, referred to as file access request) from information processing devices 1 and 2. That is, channel control unit 1 (CHN) 110 functions as NAS to a device connected to LAN 400, such as information processing devices 1 and 2.

Input/output control unit 114 gives and receives data and commands to and from a disk control unit 140, a cache memory 130, and a shared memory 120. Input/output control unit 114 has an I/O processor 119 and Non Volatile RAM (NVRAM) 115. I/O processor 119 is configured, for example, as a one chip microcomputer. I/O processor 119 is, for example, a Direct Memory Access (DMA) processor. I/O processor 119 controls giving and receiving of the data and commands and relays communication between CPU 112 and the connection unit (switch). NVRAM 115 is a non-volatile memory in which a stored program for the I/O processor 119 preferably is contained.

Figure 4:
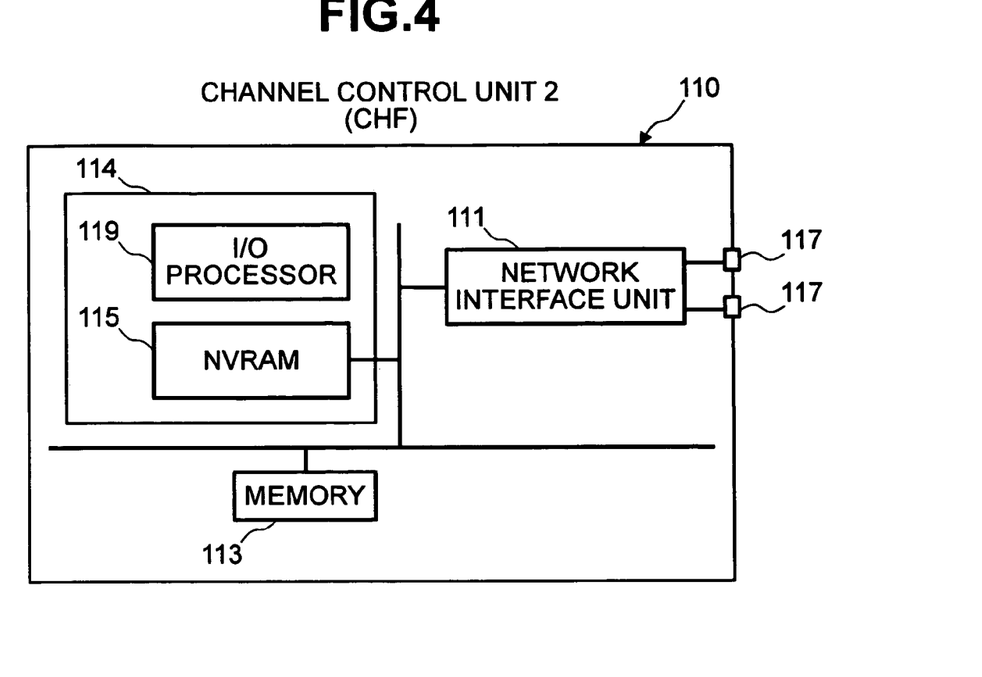
FIG. 4 is a block diagram of a channel control unit 2 (CHN) according to an embodiment of the invention.

FIG. 4 shows a hardware structure of channel control unit 2 (CHF) 110. Channel control unit 2 (CHF) 110 contains a network interface unit 111, a memory 113, an input/output control unit 114, an IP processor 119, NVRAM 115, and a communication port 117.

Channel control unit 2 (CHF) 110 differs from channel control unit 1 (CHN) 110 in structure in that it does not have CPU 112. In channel control unit 2 (CHF) 110, the file system is not operating, and it accepts a data input/output request with a block designation (hereinafter, referred to as block access request) but not with a file designation from information processing devices 1 and 2 (200). Channel control unit 1 (CHN) 110 also provides a communication function carried out through LAN 400, whereas the channel control unit 2 (CHF) 110 provides a communication function carried out through SAN 500.

Network interface unit 111 is a communication interface for connecting to SAN 500. Network interface unit 111 has two communication ports 117. A communication line to be connected to SAN 500 is connected to each communication port 117. A network address in SAN 500 is given to each communication port 117, respectively. For example, when the communication protocol of SAN 500 is a fiber channel, the network address is WWN, and different WWNs are give to each communication port 117, respectively.

Input/output control unit 114 gives and receives data and commands to and from disk control unit 140, cache memory 130, and shared memory 120. Input/output control unit 114 includes I/O processor 119 and NVRAM 115. I/O processor 119 is configured, for example, by a one chip microcomputer. I/O processor 119 is, for example, a DMA processor. I/O processor 119 controls giving and receiving of data and commands, and relays communication between CPU 112 and the connection unit(switch). NVRAM 115 is a non-volatile memory in which a program for governing controls of I/O processor 119 is stored.

Figure 5:
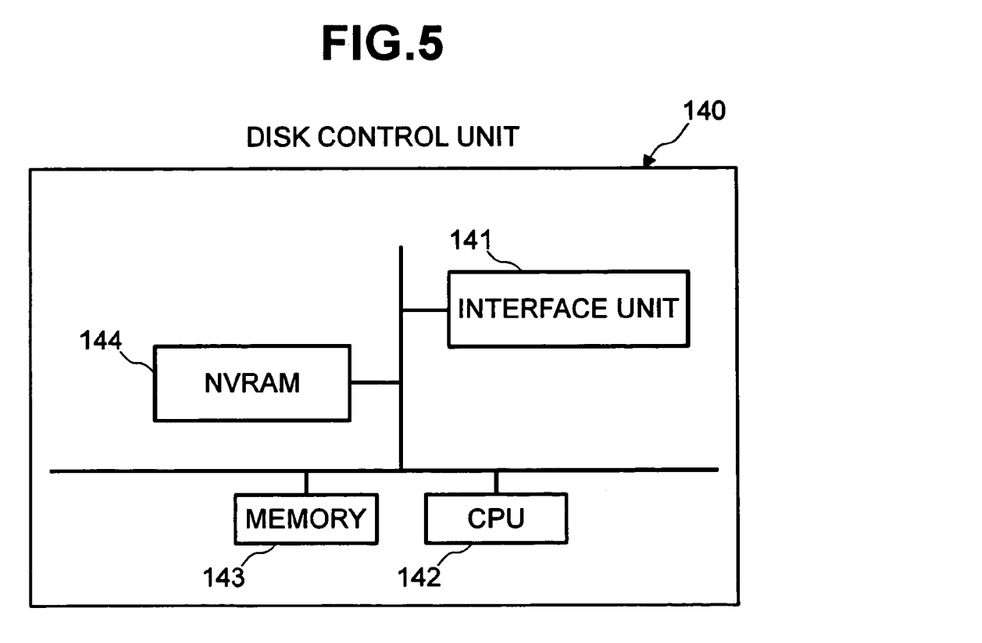
FIG. 5 is a block diagram of a disk control unit according to an embodiment of the invention.

Disk control unit 140 controls disk drive 300. Disk control unit 140, for example, carries out writing of data to disk drive 300 in accordance with a data write command that channel control unit 110 receives from information processing device 200. FIG. 5 shows a hardware structure of disk control unit 140. Disk control unit 140 itself includes an interface unit 141, a memory 143, CPU 142, and a NVRAM 144. Interface unit 141 contains a communication interface for communicating with channel control units 1 and 2 (110) through connection unit 150 and for accessing shared memory 120, and cache memory 130. Interface unit 141 also contains a communication interface for carrying out communication with disk drive 300.

CPU 142 governs the entire disk control unit 140 and carries out communication with channel control units 1 to 2 (110) and disk drive 300. By executing various programs stored in memory 143 and VNRAM 144, functions of disk control unit 140 relating to this embodiment are implemented. Functions which are realized by disk control unit 140, for example, include control of disk drive 300 and various controls regarding implementing RAID functions. NVRAM 144 is a non-volatile memory which stores a program for governing controls of CPU 142.

As shown in FIG. 1, channel control units 1 and 2 (110), shared memory 120, cache memory 130, and disk control unit 140 are connected to each other, respectively, through connection unit 150 in a manner such that they can communicate with each other. Connection unit 150 is, for example, a switch such as a high-speed crossbar or crossbus switch which carries out data transfer by high-speed switching. Connection unit 150 contains a control processor (not shown) for controlling the switching. Shared memory 120 and cache memory 130 are shared by channel control units 1 and 2 (110) and disk control unit 140. Shared memory 120 is mainly used for storing control information and commands, whereas cache memory 130 is mainly for storing data.

Basic Operation

Next, the operation of storage control device 100 is described when data input or output requests are received, for example, from information processing devices 1 and 2 (200). First, a case where the data write request was transmitted from information processing devices 1 and 2 (200) to storage control device 100 is described. Channel control units 1 and 2 (110) of storage control device 100, on receiving the data write request transmitted from information processing devices 1 and 2 (200), write a data write command in shared memory 120, and write the data which were received from information processing devices 1 and 2 (200) in cache memory 130. Channel control units 1 and 2 (110), when the writing of data to cache memory 130 is completed, transmits a write completion report to information processing device 200. The completion report to information processing device 200 is carried out asynchronously with a data write operation to disk drive 300. Disk drive unit 140 monitors contents of shared memory 120 in real time (e.g., at a given time interval). Disk control unit 140, when it detects by monitoring that a data write command has been written in shared memory 120, reads out data from cache memory 130 which becomes a write target (hereinafter, referred to as write data), and writes the write data in disk drive 300. In this manner, the data corresponding to the data write request is written to disk drive 300.

Next, the operation of storage control device 100 when a data write request is transmitted from information processing device 200 to storage control device 100 is described. Storage control device 100, on receiving the data read request transmitted from information processing device 200, delivers a data read command which corresponds to this request to disk control unit 140. In addition, there may be a transfer of the read command from channel control units 1 and 2 (110) to disk control unit 140 carried out through shared memory 120.

Disk control unit 140, on receiving the data read command from channel control units 1 and 2 (110), reads data as a read target designated to that command from disk drive 300, and writes the read data in cache memory 130. When data transfer to the cache memory 130 is completed, disk control unit 140 notifies channel control units 1 and 2 (110) of that fact. And channel control units 1 and 2 (110), which received the notification, transfer the data as a read target which is stored in the cache memory 130 to information processing devices 1 and 2 (200).

As described above, channel control unit 1 (CHN) 110 accepts a file access request with file designation through LAN 400 as the data input/output request from information processing devices 1 and 2 (200). Alternatively, channel control unit 2 (CHF) 100 accepts a block access request with block designation through SAN 500 as the data input/output request from information processing devices 1 and 2 (200).

Trouble Monitoring and Trouble Handling

A software application for mutually monitoring the operation status of channel control unit 1 (CHN) 110 and information processing devices 1 and 2 (200), resides in channel control unit 1 (CHN) 110. In addition, in a system which is configured with multiple computers, there are many situations where a "cluster" mechanism is installed, with the aim of providing high availability, improving processing efficiency by load balancing, and improving reliability through parallel execution of identical processing. In cases like these, the previously described function for mutually monitoring the operation status of another device is provided as a function of the application software for implementing the functionality of a cluster. This is often referred to as cluster software 160.

Cluster software 160 monitors the operation of a clustered device by transmitting and receiving a heartbeat message to and from each participating device through LAN 400. When the heartbeat message is received at the expected time, cluster software 160 determines that the device is operating normally. When the heartbeat message from the clustered device is not received at the expected time, i.e., when the heartbeat message has been disrupted, cluster software 160 determines that a problem occurred in the clustered device. The expected time mentioned above is set to an appropriate value, taking into consideration the loads which the heartbeat message applies to storage control device 100, information processing device 200, LAN 400 and so on, the swiftness required for detection of problems, and so on. Cluster software 160, which operates in channel control unit 1 (110), stores an IP address of the clustered device side which is transmitting the heartbeat message thereto. When an information processing device 200 to which the heartbeat message is not transmitted is in the configuration, cluster software 160 has a function for specifying the IP address of that information processing device 200. In addition, the method of monitoring the operating status of the clustered devices is not limited to the one described above using the heartbeat message.

When cluster software 160 of storage control device 100 detects that the heartbeat message from information processing device 200 has been disrupted, storage control device 100 restricts the data input/output request processing from device 200 to channel control unit 2 (110). Here, the processing for restricting processing is carried out in response to the data input/output request means. For example, when channel control unit 2 (110) receives a data input/output request transmitted from information processing device 200, which is having a problem, it means processing to not carry out processing corresponding to the data input/output request, processing for controlling not to output the control signal in response to the data input/output request, or processing not to transmit a reception notification to information processing device 200 in accordance with the data input/output request. In the following, restricted processing carried out in response to a data input/output request transmitted from information processing device 200 to channel control unit 2 (CHF) 110, where channel control unit 1 (CHN) 110 detected that the heartbeat message from an information processing device 200 had been disrupted is described as follows.

Figure 6:
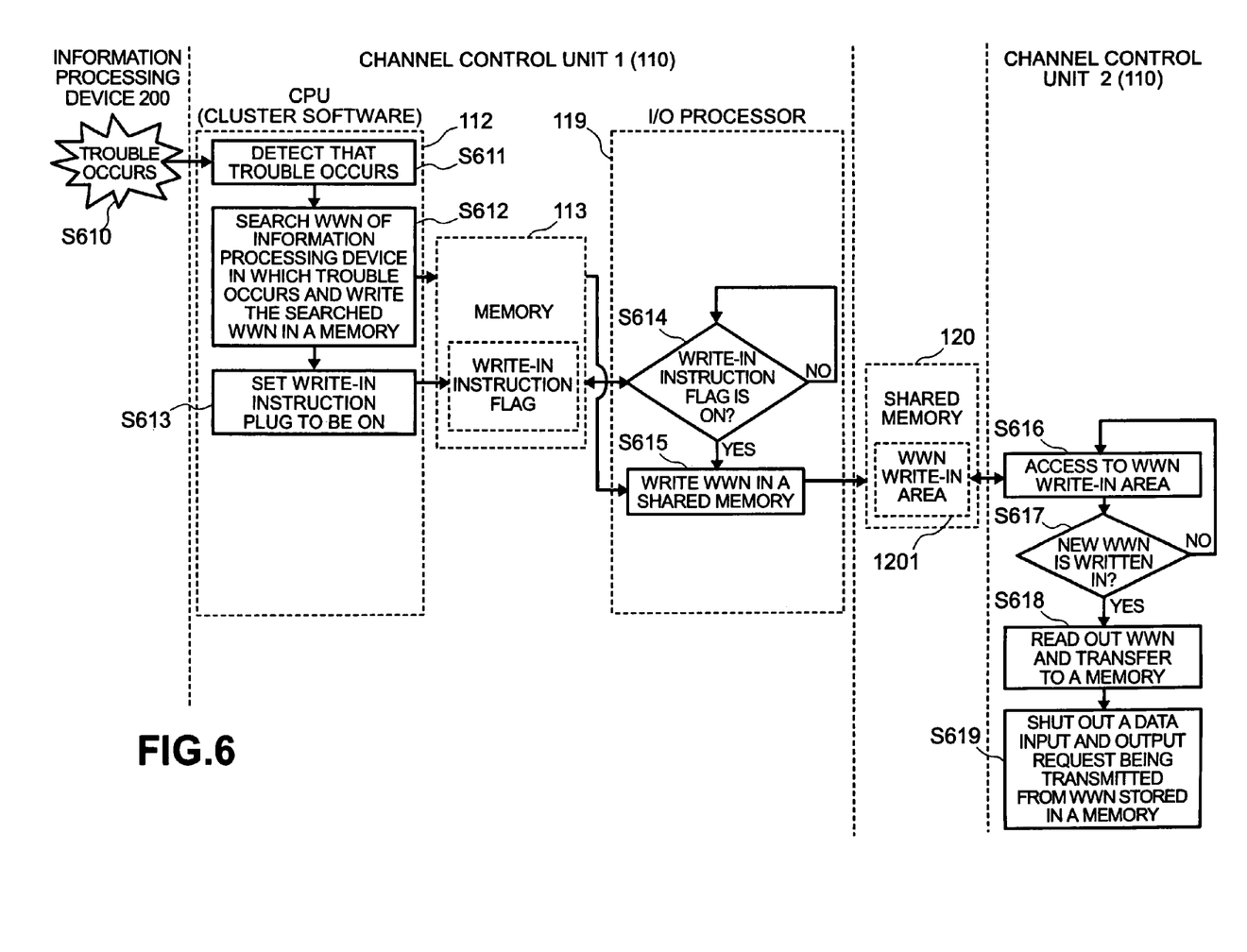
FIG. 6 is a flow chart explaining how processing is carried out when a data input or output request is restricted, according to an embodiment of the invention.

FIG. 6 is a flow chart explaining one example of restricted processing carried out in response to a data input/output request from information processing device 200 and applied to the channel control unit 2 CHF) 110 when channel control unit 1 (CHN) 110 detects that the heartbeat message from a certain information processing device 200 has been disrupted. When a problem occurs in a certain information processing device 200 (S610) and it is detected that the heartbeat message from that device has been disrupted (S611), cluster software 160, which is operating in channel control unit 1 (CHN) 110, searches SAN 500 for the network address World Wide Net, (WWN) which was given to the defective information processing device 200. In this example, the search is carried out by specifying an IP address given to the defective information processing device 200 and by referring to an information processing device-WWN correspondence management table 700 shown in FIG. 7 using an IP address as a search key. Information processing device-WWN correspondence management table 700 is stored in memory 113 of the channel control unit 1 (CHN) 110, NVRAM 115, or disk drive 300. WWN correspondence management table 700 is registered in the information processing device, and corresponds to the IP address on LAN 400 given to the defective information device, which is provided to each information processing device 200 and WWN on SAN 500. The cluster software 160 writes the searched WWN in memory 113 (S612).

Next, the cluster software 160 sets a write instruction flag, which is managed in memory 113, to ON (S613). The I/O processor 119 of channel control unit 1 (CHN) 110 monitors the content of the write instruction flag in real time. When I/O processor 119 of channel control unit 1 (CHN) 110, detects that the write instruction flag is ON (S614:YES), the processor transfers the WWN from memory 113 to shared memory 120 (S615), into a WWN write area 1201.

I/O processor 119 of channel control unit 2 (CHF) 110 monitors the content of the WWN write area 1201 of shared memory 120 (S616). When I/O processor 119 detects that new a WWN has been written in WWN write area 1201 (S617:YES), the processor reads the WWN and transfers it to memory 113 of channel control unit 2 (CHF) 110 (S618). By this procedure, the WWN of the defective information processing device 200 is managed in real time in memory 113 of channel control unit 2 (CHF) 110.

I/O processor 119 of channel control unit 2 (CHF) 110, when WWN is stored in memory of the channel control unit 2 (CHF) 110, determines whether restricted processing is to be carried out in response to the data input/output request transmitted from information processing devices 1 and 2 (200) through SAN 500. Channel control unit 2 (CHF) 110, when the data input/output request is being transmitted from information processing device 200 to which the same WWN is given as the WWN stored in memory 113, restricts the processing of that data input/output request (S619).

At this point, a determination is made whether the data input/output request is one which was transmitted from the information processing device 200 to which the WWN stored in memory 113 was given. WWN stored in the memory 113 is compared with WWN that was transmitted collaterally with the data input/output request specifying a communication port 2191 as a transmission source.

According to the above-described method, when a problem arises in information processing device 200, processing regarding the data input/output request which was transmitted from that information processing device 200 is restricted. In this way, it is possible to prevent problems as data to be stored in the disk drive 300 being destroyed due to an abnormal command or abnormal data transmitted from defective information processing device 200, and no administrative mismatch in data occurs, so that it is possible to improve the reliability and availability of the storage system.

In addition, when a defect of information processing device 200 is resolved, by the function of cluster software 160, or by a manual operation by an operator, the WWN of information processing device 200 is deleted from the WWN write area 1201. I/O processor 119, in that case, in monitoring the WWN which is stored in memory 113 of the channel control part 2 (110) deletes the WWN write area 1201 of shared memory 120, and deletes that WWN from memory 113 of the channel control unit 2 (110). When, by this procedure, the problem with information processing device 200 is resolved and normal operation has been initiated, restricted processing of the data input/output request transmitted from related information processing device 200 is automatically resumed.

The procedure also may be designed so that a flag corresponding to each WWN (hereinafter referred to as suppression release flag) is stored in WWN write area 1201, is managed in the shared memory 120, and channel control unit 2 (CHF) 110 determines whether restricted processing responsive to the data input/output request is carried out in response to the contents of the suppression release flag. In the case of using the suppression release flag as above, it may be designed, for example, that information representing whether each channel control unit 2 (CHF), referred or not, is managed in shared memory 120, and after confirming that all of channel control units 2 (CHF) 110 which should refer to WWN do refer to the WWN, shared memory 120 deletes the WWN from the WWN write area 1201. By doing this when there are multiple channel control units 2 (CHF) 110, it is possible to have a procedure to determine whether each channel control unit 2 (CHF) 110 must individually restrict the processing responsive to the data input/output request.

Figure 7:
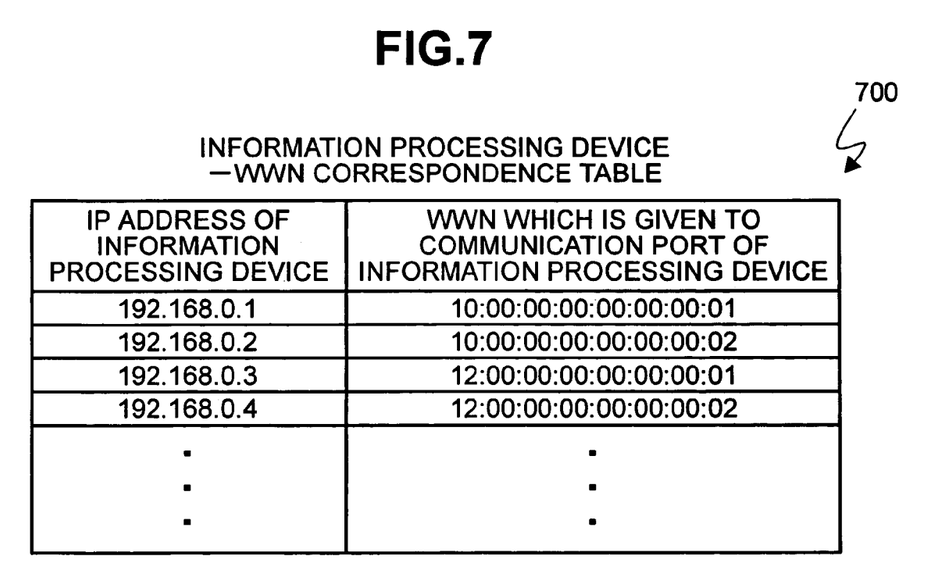
FIG. 7 shows an information processing device-WWN correspondence management table according to an embodiment of the invention.
Figure 8:
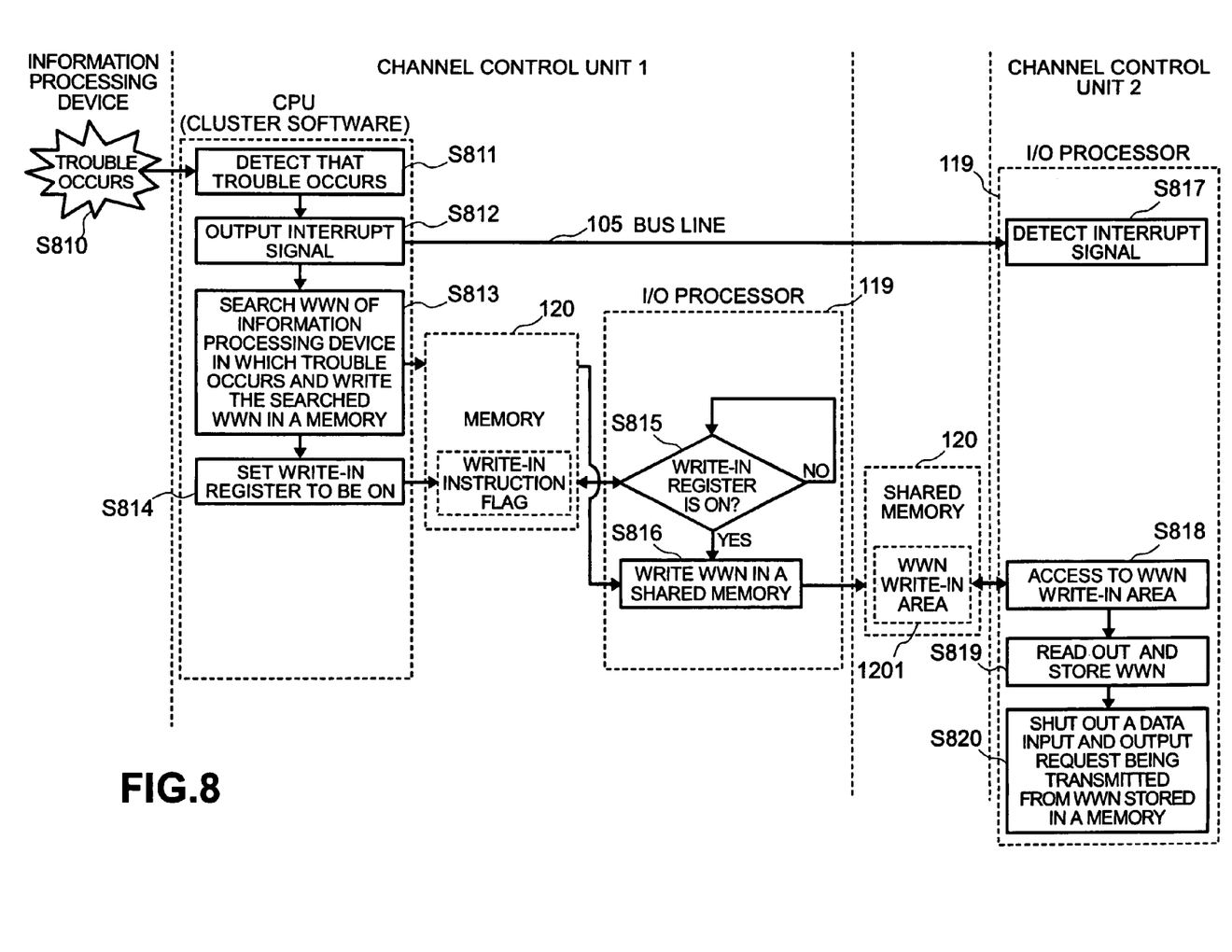
FIG. 8 is a flow chart of another example of processing carried out in response to a restricted data input and output request, according to an embodiment of the invention.

FIG. 8 is a flow chart explaining another embodiment for restricting processing when a heartbeat message from a certain information processing device 200 has been disrupted, and the system is responding to the data input/output request transmitted from that information processing device 200 to channel control unit 2 (110). The cluster software operates in channel control unit 1 (CHN) 110, when a problem arises in a certain information processing device 200 (S810), and when it detects that a heartbeat message from that information processing device 200 has been disrupted (S811), outputs an interrupt signal representing that a has occurred in some of the information processing devices 200 to channel control unit 2 (110) through bus line 105 (S812). Cluster software 160 also searches on SAN 500 a network address (WWN), which is given to the defective information processing device 200. In this example, the search is carried out by specifying an IP address given to the defective information processing device 200, and by referring to the information processing device-WWN correspondence management table 700 by use of that IP address as a search key. Cluster software 160 writes the searched WWN in memory 113 (S813).

Next, cluster software 160 sets a write instruction flag, which is managed in memory 113 to ON (S814). I/O processor 119 of channel control unit 1 (CHN) 110 monitors the content of the write instruction flag in real time. When I/O processor 119 of channel control unit 1 (CHN) 110 detects that the write instruction flag is ON (S815:YES), transfers WWN, which has been written in memory 113, to shared memory 120 (S815). The WWN which was transferred to shared memory 120 is written in the WWN write area 120, the storage area secured in shared memory 120.

I/O processor 119 of channel control unit 2 (CHF) 110, in response to having received the interrupt signal from channel control unit 1 (CHN) 110 (S817), accesses shared memory 120 (S818), and stores the new WWN, which is written in the WWN write area 1201 in memory 113 of channel control unit 2 (CHF) 110 (S819). In this way, the WWN of the defective information processing device 200 is managed in memory 113 of channel control unit 2 (CHF) 110 in real time.

I/O processor 119 of channel control unit 2 (CHF) 110, in a case where the above-described WWN is stored in memory 113 of channel control unit 2 (CHF) 110, determines whether to restrict processing in response to the data input/output request transmitted from the information processing devices 1 and 2 (200) through SAN 500. Channel control unit 2 (CHF) 110, when the data input/output request was transmitted from information processing device 200 to which the same WWN was given as the WWN which stored in memory 113, restricts processing responding to that data input/output request (S820). Here, the determination is made whether the data input/output request is one transmitted from the information processing device 200 to which the WWN stored in the memory 113 was given, by comparing the WWN stored in memory 113 with the WWN transmitted concurrently with the data input/output request for specifying communication port 2191 as a transmission source.

According to the above-described method, when channel control unit 1 (CHN) 110 detects a problem in information processing device 200, it is controlled in a manner such that the processing to be carried out in response to the data input/output request by channel control unit 2 (CHF) 110 at which the data input/output request transmitted from information processing device 200 is received is restricted. In this way, it is possible to prevent such problems abnormal processing by the channel control unit 2 (CHF) 110 in response to an abnormal data input/output request being transmitted from a defective information processing device 200, data to be stored (or, which is stored) in disk drive 300 is destroyed, and/or administrative mismatches of data occur. Furthermore, it is possible to improve the reliability and availability of the storage system. When problems occur in information processing device 200, the interrupt signal is sent from channel control unit 1 (110) to channel control unit 2 (110) through bus line 105, and the channel control unit 2 (CHF) 110, in response to the interrupt signal being inputted, accesses shared memory 120; therefore, as compared to the above-described method shown in FIG. 6 for accessing shared memory 120 in real time, it is possible to reduce the load to channel control unit 2 (CHF) 110.

In addition, as above, when the configuration of storage control device 100 includes a multiplicity of channel control units 110, and at least one of channel control units 110 can provide a mechanism for detecting a problem in information processing device 200, it is possible to restrict processing to be carried out in response to the data input/output request transmitted from defective information processing device 200. This is achieved by internal communication of storage control device 100, providing better reliability and availability.

High Speed Access Control

Next, high-speed access control of a file relating to another embodiment of the invention is described. The high-speed access control of a file stored in disk drive 300 using information processing device 200 through SAN 500 in this embodiment relates to carrying out high-speed data access of a block unit. As shown in FIG. 1, information processing device 1 (200) is connected to channel control unit 1 (CHN) 110 through LAN 400, Information processing device 1 (200) is also connected to channel control unit 2 (CHF) 110 through SAN 500. In this way, information processing device 1 (200) can access the file data which stored in disk drive 300 through channel control unit 1 (CHN) 110, and can access the identical data through channel control unit 2 (CHF) 110. When access is made, however, through channel control unit 1 (CHN) 110, it is an access of a file unit, whereas when access is made through channel control unit 2 (CHF) 110), it is an access of a block unit.

Normally when information processing device 1 (200) accesses data stored in disk drive 300 through channel control unit 1 (CHN) 110, a file access request designating a file name is sent to channel control unit 1 (CHN) 110, but in case of access to data stored in disk drive 300 by high-speed access control of a file, information processing device 1 (200) first designates a file name, and then carries out a metadata request (file management information), thereby providing information specifying the position of a file on the storage area of the storage device. The metadata is, for example, an i-node in UNIX®. Channel control unit 1 (CHN 110) which accepted the metadata request, reads metadata which corresponds to the file name stored in memory 113 or cache memory 130. Then, channel control unit 1 transmits the metadata to information processing device 1(200) through LAN 400. In addition, because the metadata is also stored in disk drive 300, it is possible to arrange for channel control unit 1 (CHN) 110 to read metadata from disk drive 300.

By obtaining the metadata, information processing device (200) learns the position and size of a stored data file. Information processing device (200) generates a block access request to the file data on the basis of this information, and the request is transmitted to channel control unit 2 (CHF) 110 through SAN 500.

Channel control unit 2 (CHF) 110 accepts the block access request through network interface unit 111. I/O processor 119 extracts the stored position of the data, the data length and the like, and generates an I/O request which corresponds to the block access request, and forwards it to disk control unit 140. In this manner, reading and writing data are carried out. Since SAN 500 is a network capable of high-speed data transfer, as compared to LAN 400, it is possible to access file data stored in disk drive 300 at high speed.

Information processing device 1 (200), when reading file data from disk drive 300, transmits the block unit data read request by designating the address and size of the data file to channel control unit 2 (CHF) 110. Channel control unit 2 (CHF) 110 transmits the data which was read from disk drive 300 through SAN 500 to information processing device 1 (200). Information processing device 1 (200), when obtaining the data from channel control unit 2 (CHF) 110, completes the read processing. In addition, when obtaining metadata from channel control unit 1 (CHN) 110, a file has been locked, a lock release request is transmitted to channel control unit 1 (CHN) 110.

When writing file data in disk drive 300, information processing device 1 (200) transmits a data write request for the block unit by designating the write address, the quantity of write data, and the write data itself, to channel control unit 2 (CHF) 110. Channel control unit 2 (CHF) 110 writes the write data in disk drive 300, and transmits a write completion message to information processing device 1 (200). The Information processing device 1 (200), on receiving the write completion message from channel control unit 2 (CHF) 110, requests the return of the metadata to channel control unit 1 (CHN) 110.

The high-speed access control of a file has a dramatic effect when accessing a large-size data file. By carrying out access to a large-size data file through high-speed SAN 500, it is possible to shorten the read/write time of the file data. This can be realized, in storage system 600, by mounting channel control unit 1 (CHN) 110 and channel control unit 2(CHF) 110 in a slot of storage control device 100 and arranging them in a mixed manner. It is also possible to use the respective features of data access through channel control unit 1 (CHN) 110 and data access through channel control unit 2 (CHF) 110.

In high-speed access control of a file relating to this embodiment, an access from information processing unit 1 (200) to channel control unit 1 (CHN) 110 and an access from information processing unit 1 (200) to channel control unit 2 (CHF) 110 are carried out in association with each other. The monitoring and troubleshooting benefits are realized even in such mode. That is, when information processing device 1 (200) and channel control unit 1 (CHN) 110, which configures the cluster, detect a problem in information processing device 1(200), it is controlled in a manner such that processing to be carried out in response to the data input/output request is restricted by channel control unit 2 (CHF) 110. That is, when an access from information processing unit 1 (200) to channel control unit 1 (CHN) 110 and an access from information processing unit 1 (200) to channel control unit 2 (CHF) 110 are carried out in association with each other, the above-described of monitoring and resolving problems is especially beneficial. In this way, problems that arise when channel control unit 2 (CHF) 110 carries out abnormal processing in response to an abnormal data input/output request transmitted from information processing device 1(200) or, when data stored in disk drive 300 is destroyed, or a mismatch of data occurs, are avoided.

Another Embodiment of the Storage System

Figure 9:
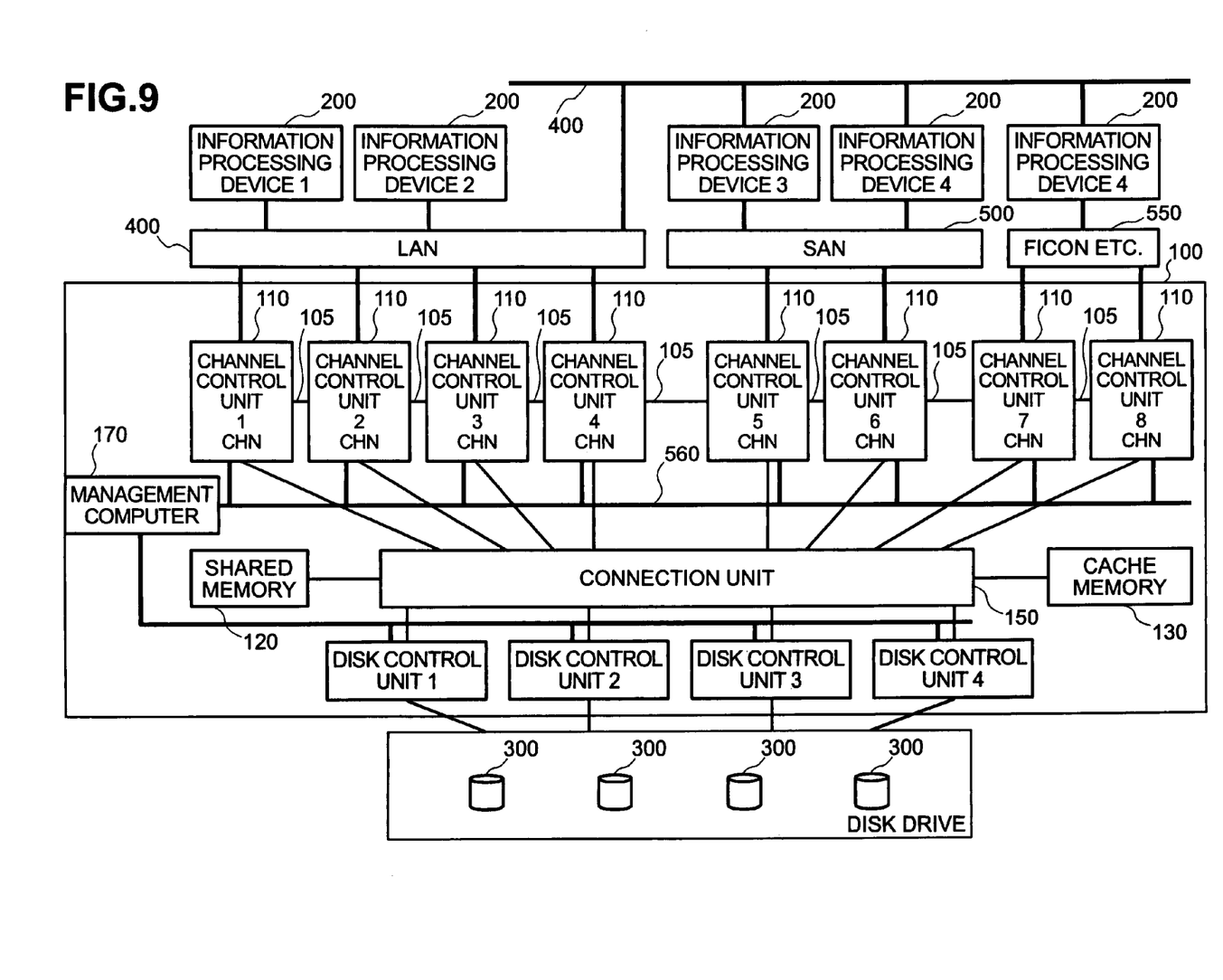
FIG. 9 illustrates another configuration of a storage system according to an embodiment of the invention.

FIG. 9 shows another embodiment of the storage system. This storage system is configured by including storage control device 100, information processing devices 1 to 5 (200) which are connected to storage control device 100 in a manner such that they can communicate with each other. They also can transmit a data input/output request to storage control device 100 for one or more disk drives 300 controlled by storage control device 100. Storage control apparatus 100 receives the data input/output request transmitted from information processing devices 1 to 5 (200), and then carries out writing and reading of data stored in disk drive 300, in response to this data input/output request.

Storage control device 100 and information processing devices 1 to 5 (200) are connected to each other through LAN 400 in a manner such that they can communicate with each other. Communication through LAN 400, for example, is carried out in accordance with the TCP/IP protocol. Information processing devices 3 and 4 (200) and storage control device 100 are connected to each other through SAN 500 in a manner such that they can communicate with each other. Communication through SAN 500 is preferably carried out using the fiber channel. Information processing device 5 (200) and storage control device 100 are connected to each other through a communication path 550 in which communication is carried out in accordance with a communication protocol such as iSCSI, FICON® and ESCON®, ACONARC®, or FIBARC®.

Information processing devices 1 to 5 (200) preferably are provided as a computer which has a Central Processing Unit (CPU) and a memory. Information processing devices 1 to 5 (200), for example, can be a personal computer, a work station, a mainframe computer, etc. The CPU that information processing devices 1 to 5 (200) have carries out various programs, and thereby, implements the various functions of the information processing devices 1 to 5 (200). Operating systems are running in information processing devices 1 to 5(200). Various application programs are operating on the operating systems, and in at least any one of information processing devices 1 to 5 (200), the above-described cluster software 160 is operating.

Storage control device 100 includes channel control units 1 to 8 (110) which provide functions regarding communication with the information processing devices 1 to 5 (200). From among these units, channel control units 1 to 4 (CHN) 110 provide a function regarding communication with information processing devices 1 to 3 (200) through LAN 400. In addition, channel control units 1 to 8 (110) are connected through bus line 105 in a manner such that they can communicate with each other. Channel control units 1 to 4 (110) can transmit or receive a data signal, an interrupt signal, and so on, to or from each other through this bus line 105.

Channel control units 1 to 4 (110) have an equivalent hardware and software structure to that of channel control unit 1 (CHN) 110, which was explained in the first embodiment. Channel control units 5 to 8 (CHF) 110 have the same hardware and software structure as that of the channel control unit 2 (CHN), 110 explained above.

In at least one of channel control units 1 to 4 (CHF) 110, the cluster software 160 is operating. Cluster software 160, when a heartbeat message from a certain information processing device 200 is disrupted, carries out processing as explained in the flow charts of FIG. 6 or FIG. 8. This operation restricts processing carried out in response to a data input/output request from the defective information processing device 200 to other channel control units 1 to 8 (110). In addition, with the storage system shown in FIG. 9, it is possible to arrange that when channel control unit 1(CHN)110 detects a problem in a certain information processing device 200, not only is the processing in response to the data input/output request to channel control unit 2 (CHF) 110 is restricted, but processing in response to a data input/output request transmitted to another channel control unit 1 (CHN) 110 than channel control unit 1 (CHN) 110 is also restricted.

The hardware and software structure of disk control units 1 to 4 (140) is equivalent in structure to that of disk control unit 140, which was explained in the first embodiment. Channel control units 1 to 8 (110), shared memory 120, cache memory 130, and disk control unit 140 are connected through connection unit 150 in a manner such that they can communicate with each other. Connection unit 150 is, for example, a switch such as a super-high-speed crossbar switch which carries out data transfer by high-speed switching. Shared memory 120 and cache memory 130 are memories which are shared by the channel control units (110) and disk control unit 140. Shared memory 120 is primarily used for storing control information, commands and so on, whereas cache memory 130 is primarily used for storing data.

Disk drive 300 provides a storage area for information processing device 200. Data is stored in a logic volume as a storage area logically set on a physical storage area which is provided by disk drive 300. Disk drive 300, for example, usually is provided as a hard disk drive, but may also be provided as a semiconductor storage device or other media. The basic operation of storage control device 100 when a data input/output request has been received from information processing devices 1 to 5 (200), is essentially the same as the operation described for the storage system of the first embodiment.

The management computer (SVP) 170 is a computer for repairing and maintaining storage system 600. Management computer 170 is connected to channel control units 1 to 8 (110) and disk control units 1 to 4 (140) through an internal LAN 560 which is disposed inside of storage control device 100.

Using management computer 170, for example, it is possible to set disk drive 300, set the logic volume, and install a micro-program which is executed in channel control units 1 to 8 (110). In this example, for the setting of disk drive 300, it is possible to expand and reduce disk drive 300, to change the RAID structure (e.g., change from RAID1 to RAID5) and so on. Furthermore, it is also possible to acquire from management computer 170, confirmation of the operating status of storage system 600 and identification of a problem location, installation of an operating system and application programs which are executed in channel control units 1 to 4 (CHN) 110.

Management computer 170 can be built into storage control device 100, or can be provided as an external device. Management computer 170 can be a computer which exclusively carries out repair and maintenance of storage control device 100 and disk drive 300, or a commonly used computer to which the repair and maintenance function was added.

On operating system 701, which is operating in channel control units 1 to 4 (CHN) 110, other than the above-described cluster software 160, various software such as a RAID manager, a volume manager, a file system program, NFS (Network File System) and so on is operating. Among the programs, RAID manager software allows a person using information processing devices 1 to 5 (200) to set and control of parameters of disk control device 140. Types of parameters to be set, include, for example, a parameter for defining (structural information of RAID group, designation of stripe size, etc.) disk drive 300 (physical disk) which configures the RAID group, a parameter for setting RAID levels (e.g., 0, 1, 5), and so on. The volume manager provides a virtual logic volume which is provided by a RAID control unit 740, that is, further virtualized LU, to a file system program 703. One virtual logic volume is configured by one or more logic volumes. The file system program manages correspondence of a file name which is designated in a file access request received by a network control unit 702 and an address of the virtual logic volume in which the file name is stored. For example, file system program 703 specifies an address in the virtual logic volume which corresponds to the file name designated in the file access request. Network File System (NFS) 711 accepts the file access request from information processing device 200 of UNIX® on which NFA 711 operates.

The above-described embodiments of the invention are intended to facilitate understanding of the invention, and are not for interpretation of the invention in a limited manner. Various modifications, additions and substitutions are possible without departing from the scope and spirit of the invention as described in the accompanying claims.

What is claimed is:

1. A control method for a storage control apparatus comprising:
   a plurality of channel control units connected to communicate with each other and which receive a data input and data output requests to be transmitted from an information processing device, and output a control signal to control writing and reading of data to a storage device in accordance with the data input/output request; and
   a disk control unit which carries out the writing and reading of data to the storage device in accordance with the control signal,
   wherein a first channel control unit monitors an operation of the information processing device by communicating with the information processing device; and
   the first channel control unit, upon detection of a problem in the information processing device, carries out processing for restricting processing to be carried out in accordance with the data input/output request by a second channel control unit to which the data input/output transmitted from the information processing device is arrived.

2. The control method of claim 1 wherein the processing for restricting processing to be carried out in response to the data input and output request comprises, having received the data input and output request transmitted from the information processing device in which the problem was detected, processing for controlling not to output the control signal to be outputted in accordance with the data input and output request.

3. The control method of claim 1 wherein the first channel control unit transmits a heartbeat signal between the first channel control unit and the information processing device, and detects that a problem occurred in the information processing device by a fact that the heartbeat signal was disrupted.

4. The control method of claim 1 wherein the first channel control unit includes a function for accepting a data input and output request with file designation as the data input and output request to be transmitted from the information processing device, and the second channel control unit has a function for accepting a data input and output request with block designation as the data input and output request to be transmitted from the information processing device.

5. The control method of claim 1 wherein the monitoring of the operation of the information processing device to be carried out by communicating with the information processing device is provided by a function of cluster software in the first channel control unit.

6. The control method as in claim 1 wherein the first channel control unit includes an interface to be connected to LAN, and the second channel control unit includes an interface to be connected to SAN.

7. A storage control apparatus comprising:
a plurality of channel control units which are connected in such a manner that they can communicate with each other and which receive a data input and output request to be transmitted from an information processing device and output a control signal to control write-in and read-out of data to a storage device in accordance with the data input and output request;
a disk control unit which carries out the write-in and read-out of data to the storage device in accordance with the control signal;
a unit which monitors an operation of the information processing device by an activity that a first channel control unit communicates with the information processing device;
a unit which carries out processing for restricting processing to be carried out in response to the data input and output request by a second channel control part to which the data input and output request transmitted from the information processing device is arrived, in case that the first channel control unit detects a trouble in the information processing device.

8. The storage apparatus as in claim 7 wherein the first channel unit includes a function for accepting a data input and output request with file designation as the data input and output request being transmitted from the information processing device; and the second channel unit includes a function for accepting a data input and output request with block designation as the data input and output request being transmitted from the information processing device.

9. A control method for a storage control apparatus including a plurality of channel control units connected to communicate with each other and which receive a data input and output request to be transmitted from an information processing device and output a control signal to control write-in and read-out of data to a storage device in accordance with the data input and output request, a disk control unit for write-in and read-out of data to the storage device in accordance with the control signal, and a shared memory accessible from each channel control unit, the method comprising:

a first channel control unit monitoring an operation of the information processing device by communicating with the information processing device;

the first channel control unit, when it detects a problem in the information processing device, storing an identifier by which the information processing device can be identified in the shared memory;

a second channel control unit obtaining the identifier by accessing to the shared memory; and the second channel control unit, having received the data input and output request transmitted from the information processing device having the identifier obtained, carries out processing for restricting processing to be carried out in response to the data input and output request.

10. A control method of a storage control apparatus comprising:
a plurality of channel control units which are connected in such a manner that they can communicate with each other and which receive a data input and output request to be transmitted from an information processing device and output a control signal to control write-in and read-out of data to a storage device in accordance with the data input and output request;
a disk control unit which carries out the write-in and read-out of data to the storage device in accordance with the control signal; and
a shared memory which can be accessed from each channel control unit,
wherein a first channel control unit monitors an operation of the information processing device by communicating with the information processing device;
the first channel control unit, when it detected a problem in the information processing device, stores an identifier by which the information processing device can be identified in the shared memory and notifies to a second channel control unit of a fact that the problem has occurred;
the second channel control unit obtains the identifier by accessing to the shared memory in response to reception of the notification at appropriate timing; and
the second channel control unit, having received the data input and output request transmitted from the information processing device having the identifier obtained, carries out processing for restricting processing to be carried out in response to the data input and output request.

11. A control method of a storage control apparatus including: a plurality of channel control units which are connected in such a manner that they can communicate with each other and which receive a data input and output request to be transmitted from an information processing device and output a control signal to control write-in and read-out of data to a storage device in accordance with the data input and output request; and a disk control unit which carries out the write-in and read-out of data to the storage device in accordance with the control signal, the method comprising:

transmitting file management information to the information processing device in accordance with the request being transmitted from the information processing device;

receiving the data input and output request generated on the basis of the file management information being transmitted from the information processing device, and carrying out the write-in and read-out responsive to this to the storage device;

monitoring an operation of the information processing device by communication of the first channel control unit with the information processing device; and carrying out processing by the first channel control unit for restricting processing to be carried out in response to the data input and output request by a second channel control unit to which the data input and output request transmitted from the information processing device is arrived, in case that the first channel control unit detected a trouble in the information processing device.

* * * * *